Nov. 14, 1944. D. SLOTSKY 2,362,725
MOUNTING MEANS FOR RIMLESS GLASSES
Filed Feb. 16, 1942
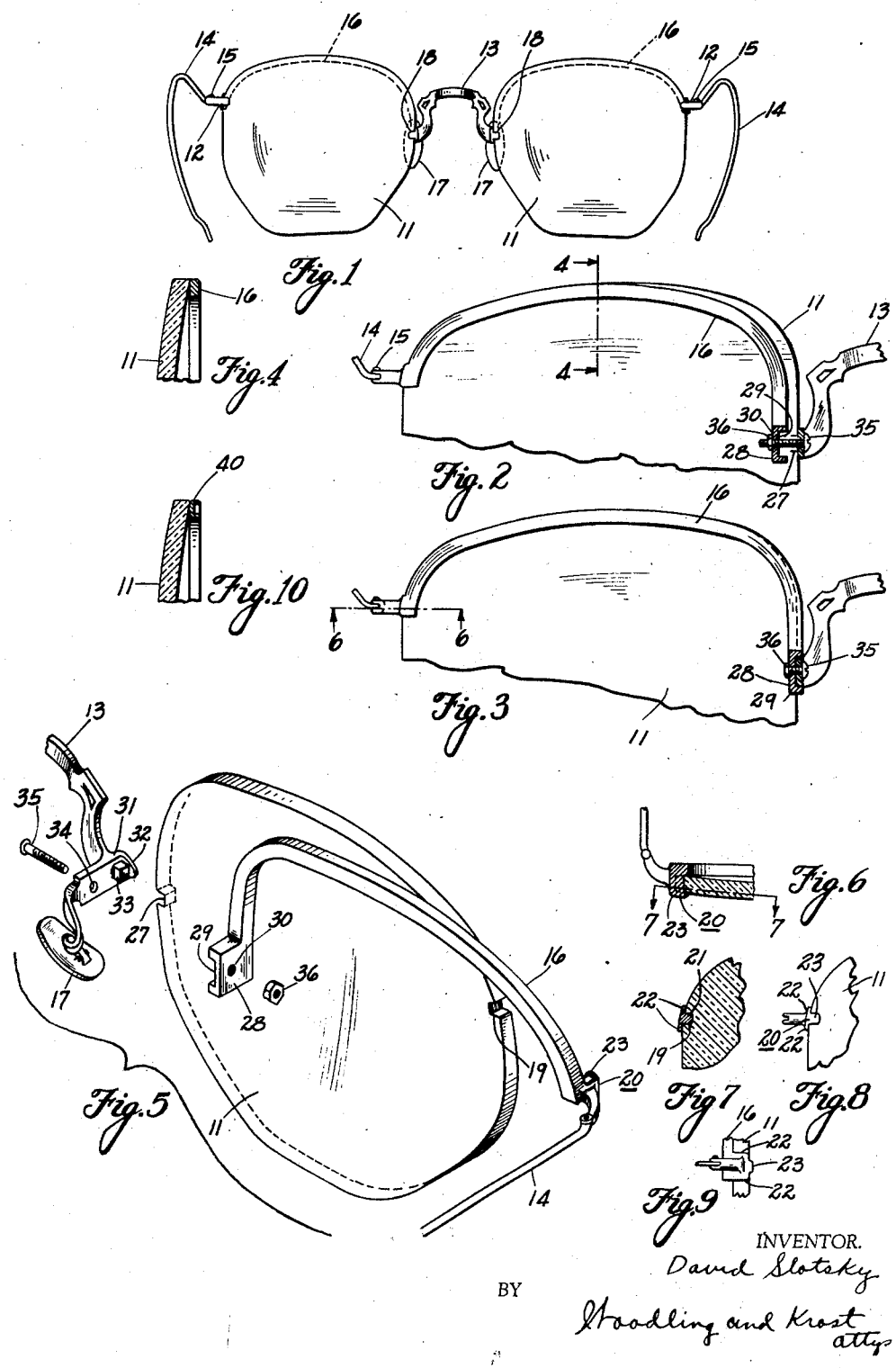
INVENTOR.
David Slotsky
BY
Woodling and Krost
attys Patented Nov. 14, 1944

2,362,725

UNITED STATES PATENT OFFICE 2,362,725

MOUNTING MEANS FOR RIMLESS GLASSES

David Slotsky, Cleveland, Ohio

Application February 16, 1942, Serial No. 431,016

12 Claims. (Cl. 88—47)

My invention relates in general to eye glasses or spectacles and more particularly to a mounting means for rimless glasses.

An object of my invention is to provide a fastening means or mounting means for eye glasses which will be substantially inconspicuous in appearance.

Another object of my invention is the provision of lens-edge members to which the lenses may be mounted.

Another object of my invention is the provision of mounting means for spectacles which causes whatever strain that may be transmitted to the lenses to be directed inwardly rather than outwardly.

Another object of my invention is the provision of spaced mounting means for connecting the lenses of a spectacle to the metal parts in which the spaced mounting means are constrained toward each other and thus relieve the marginal edges of the lenses from strain and breakage.

Another object of my invention is the provision of fastening or mounting means for spectacles in which lenses may be readily and easily removable.

Another object of my invention is the provision of a relatively strong and resilient lens-edge member which constrains the mounting means toward each other for holding the lens therein.

Another object of my invention is the provision of a detachable hook means engaging a notch in the edge of the lens and arranged to be fastened to one end of a lens-edge member in which the fastening means during the fastening of the detachable hook means to the end of the lens-edge member draws the end of the lens-edge member toward the detachable hook means in the notch in the edge of the lens.

Another object of my invention is the provision of mounting means for spectacles in which the force exerted by the mounting means for connecting the lens therein is substantially parallel to the plane of the lens.

Other objects and a fuller understanding of my invention may be had by referring to the following description and claims, taken in conjunction with the accompanying drawing, in which:

Figure 1 represents a front view of a pair of spectacles embodying the features of my invention;

Figure 2 is an enlarged fragmentary view of one lens of the spectacle, parts being shown in section to illustrate the features of the invention with the lens-edge member incompletely connected to the mounting means;

Figure 3 is a view similar to Figure 2 with the lens-edge member completely connected to the mounting means;

Figure 4 is a fragmentary cross-sectional view of the lens and the lens-edge member taken along the line 4—4 of Figure 2;

Figure 5 is an enlarged perspective and exploded view of one lens of the spectacle showing the features of my invention;

Figure 6 is a fragmentary view of the lens and the temple mounting means taken along the line 6—6 of Figure 3;

Figure 7 is a fragmentary and cross-sectional view of the temple mounting means taken along the line 7—7 of Figure 6;

Figure 8 is a fragmentary and front view of the temple mounting means;

Figure 9 is a side view of the temple mounting means; and

Figure 10 is a cross-sectional view of the lens and the lens-edge member of a modified form of that shown in Figure 4.

With reference to the drawing, my invention comprises a pair of lenses 11, temple engaging means 12, nasal engaging means 18, a nasal bridge element 13 for connecting the nasal engaging means, temple members 14 pivotally connected at 15 to the temple engaging means 12, and lens-edge members 16 interconnecting the nasal engaging means and the temple engaging means. As illustrated in Figure 5, the lens 11 is provided with a temple notch 19 and a nasal notch 27 to receive the temple engaging means 12 and the nasal engaging means 18, respectively. The lens-edge member 16 follows closely the contour of the upper edge of the lens 11 and extends between the temple and nasal notches. The temple mounting means comprises an attached hook means integrally connected to the temple end of the lens-edge member 16. The attached hook means is indicated by the reference character 20. The attached hook means comprises an interfitting portion 21 which fits complementarily into the temple notch 19 and side flange portions 22 which engage the side edge of the lens on opposite sides of the interfitting portion 21. The top of the attached hook means comprises a tab 23 which is arranged to engage the top surface of the lens. The side flange portions 22 are relatively thin and closely engage the side edge of the lens and overlap the interfitting portion 21 so that the space between the temple notch 19 and the interfitting portion 21 is not visible to an observer. The tab 23 engages the top surface of the lens around the marginal edge of the temple notch 19 and extends inwardly of the lens slightly beyond the depth of the notch. In the practice of my invention, the attached hook means for the temple engaging means may accommodate lenses of various thicknesses. For lenses which are thinner than normal lenses, the tab 23 may be bent downwardly to engage the top surface of the lens around the marginal edge of the temple notch. For lenses thicker than the normal lenses, the tab 23 may be bent outwardly to receive the thicker lens. That is to say, the person who mounts the lens in the attached hook means for the temple engaging means may bend the tab 23 to accommodate the particular thickness of lens that may be prescribed for the mounting in question. As shown in Figures 4 and 9, the lens-edge member 16 closely fits against the rear contour of the upper edge of the lens.

The nasal engaging means 18 comprises a lug portion 28, a detachable hook means 31, and a fastening screw 35. The lug portion 28 is integrally connected to the nasal end of the lens-edge member 16 and is provided with a channel 29 which extends transversely of the width of the lens. The lug portion is provided with an anchoring threadable opening 30 to receive the fastening screw 35. The detachable hook means 31 is substantially rectangular in cross-section and is arranged to closely fit within the channel 29 of the lug portion 28. As illustrated best in Figure 5, the detachable hook means 31 is provided with a tab 32 upon one end thereof and an interfitting portion 33 closely positioned thereby. The interfitting portion 33 is arranged to complementarily engage the nasal notch 27 in the edge of the lens and the tab 32 is arranged to engage the marginal edge of the lens around the nasal notch 27. The shape and dimensions of the tab 32 for the nasal engaging means are substantially the same as those of the tab 23 for the temple engaging means 12. The rectangular section of the detachable hook means 31 is provided with a fastening opening 34 to receive the fastening screw 35. A nut 36 is mounted upon the end of the fastening screw 35 to serve as a lock nut to keep the screw 35 from becoming loose.

In mounting a lens within the temple and nasal engaging means of my invention, the attached hook means 20 is first positioned in the temple notch 19 of the lens. The detachable hook means 31 for the nasal engaging means 18 is next positioned within the nasal notch 27 with the fastening screw 35 incompletely mounted as shown in Figure 2. In other words, there is a considerable space between the channel 29 and the detachable hook means 31. The fastening screw 35 should be sufficiently unscrewed such that no difficulty is encountered in positioning the detachable hook means 31 in the nasal notch 27. The next operation is to turn the fastening screw 35 until the lug portion 28 is drawn tightly against the detachable hook means 31 with the rectangular section of the detachable hook means 31 fitting snugly within the channel 29 of the lug portion 28, see Figure 3. The final operation is to turn the nut 36 down tightly and then the extended end of the fastening screw 35 may be cut off to make a good flush surface with the nut 36. The lens-edge member 16 is relatively strong and resilient and constrains the engaging means 12 and 18 in the notches for securing the lens thereto. The lens-edge member 16 is sufficiently strong so that when it is once drawn up as shown in Figure 3, the temple and nasal engaging means 12 and 18 cannot be separated to remove the lens. Accordingly, with my invention the lens is securely and firmly held within the temple and nasal engaging means. The ends of the lens-edge member 16 when mounting the lens in my mounting means are never spread beyond the width of the lens as the case would be if my nasal engaging means were not made in two separable parts wherein the screw which holds the parts together exerts a force substantially parallel to the plane of the lens. In other words, the fastening screw 35 may be said to perform two functions in that it facilitates the mounting of the nasal engaging means as well as to hold the detachable hook means 31 and the lug portion 28 together when once mounted. Another feature of my invention is that the nose pads 17 may be directly connected to the detachable hook means 31 as shown in Figures 1 and 5 which readily facilitates the easy mounting of a lens within my temple and nasal engaging means. The fastening screw 35 may exert a considerable amount of force when drawing the lug portion 28 on the nasal end of the lens-edge member 16 toward the detachable hook means 31 and thus when once the screw is tightly turned down there exists a tension upon the threads of the fastening screw 35 which prevents the screw from becoming loose which avoids a common annoyance found in screw mountings for lenses. The lens-edge member 16 may be solid as shown in Figure 4 with the greatest thickness in a plane substantially parallel to the lens to give strength thereto against spreading of the two ends. As a modification, the lens-edge member which is represented by the reference character 40 in Figure 10 may be of a channel construction as illustrated to give strength thereto against the spreading of the ends to make a good reliable mounting for holding the lens in my engaging means.

The lens-edge member is flat on the glass and thus cannot bend or give with the result that the attached hook means 20 and the detachable hook means 31 hold the lens firmly therebetween. That is to say, there is no tendency for the hook means 20 and 31 to move or rock in the notches in the edge of the lens incident to strain being imposed upon the lens-edge member 16 by bending the temple members 14 or the nasal bridge element 13. Since there is no relative movement between the hook means and the notches, the tabs 23 and 32 may be made to cover only the marginal edge of the notches without too much metal appearing on the lens which makes my mounting substantially inconspicuous. The tabs 23 and 32 fit flat on the lens and cover the space between the notches and the interfitting portions 21 and 33 to give a good appearance to my spectacles.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being connected to the lens-edge member near one of said notches and comprising hook means adapted to fit therein, and the other of said engaging means being connected to the lens-edge member near the other of said notches and comprising a lug portion connected to the lens-edge member and having an anchoring opening therein, detachable hook means adapted to fit in the said other of said notches and having a fastening opening registerable with the said anchoring opening, said lug portion being spaced inwardly of the edge of the lens in a horizontal direction from the detachable hook means, and a fastening member in the two openings and securing the detachable hook means and the said lug portion together, the lens-edge member constraining the engaging means in the notches and securing the lens thereto, said fastening member extending inwardly of the edge of the lens in a horizontal direction from the detachable hook means to the lug portion, whereby the force exerted by the fastening member in securing the detachable hook means and said lug portion together tends to spread the ends of the lens-edge member.

2. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being connected to the lens-edge member near one of said notches and comprising hook means adapted to fit therein, and the other of said engaging means being connected to the lens-edge member near the other of said notches and comprising a lug portion connected to the lens-edge member and having a threadable opening therein, detachable hook means adapted to fit in the said other of said notches and having a fastening opening registerable with the said threadable opening, said lug portion being spaced inwardly of the edge of the lens in a horizontal direction from the detachable hook means, and a threadable member in the two openings to hold the detachable hook means and the said lug portion together, the lens-edge member constraining the engaging means in the notches and securing the lens thereto, said fastening member extending inwardly of the edge of the lens in a horizontal direction from the detachable hook means to the lug portion, whereby the force exerted by the fastening member in securing the detachable hook means and said lug portion together tends to spread the ends of the lens-edge member.

3. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being connected to the lens-edge member near one of said notches and comprising hook means adapted to fit therein, and the other of said engaging means being connected to the lens-edge member near the other of said notches and comprising a lug portion connected to the lens-edge member and having an anchoring opening therein, detachable hook means adapted to fit in the said other of said notches and having a fastening opening registerable with the said anchoring opening, said lug portion being spaced inwardly of the edge of the lens in a horizontal direction from the detachable hook means, and a fastening member in the two openings to hold the detachable hook means and the said lug portion together, the lens-edge member constraining the engaging means in the notches and securing the lens thereto, said lug portion and said detachable hook means having interlocking engagement surfaces therebetween, said fastening member extending inwardly of the edge of the lens in a horizontal direction from the detachable hook means to the lug portion, whereby the force exerted by the fastening member in securing the detachable hook means and said lug portion together tends to spread the ends of the lens-edge member.

4. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being integrally connected to one end of the lens-edge member near one of said notches and comprising attached hook means adapted to fit therein, and the other of said engaging means comprising a connection portion mounted to the other end of the lens-edge member near the other of said notches and detachable hook means arranged to be detachably connected to the said connection portion, said connection portion being spaced inwardly of the edge of the lens in a horizontal direction from the detachable hook means, fastening means for securing the detachable hook means and the said connection portion together, said fastening means extending inwardly of the edge of the lens in a horizontal direction from the detachable hook means to the connection portion, whereby the force exerted by the fastening means in securing the detachable hook means and said connection portion together tends to spread the ends of the lens-edge member.

5. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being integrally connected to one end of the lens-edge member near one of said notches and comprising attached hook means adapted to fit therein, and the other of said engaging means comprising a connection portion mounted to the other end of the lens-edge member near the other of said notches and detachable hook means arranged to be detachably connected to the said connection portion, said connection portion being spaced inwardly of the edge of the lens in a horizontal direction from the detachable hook means, threadable fastening means for securing the detachable hook means and the said connection portion together, said threadable fastening means extending inwardly of the edge of the lens in a horizontal direction from the detachable hook means to the connection portion, whereby the force exerted by the threadable fastening means during the fastening of the detachable hook means to the said connection portion tends to draw the said other end of the lens-edge member away from the attached hook means in said one of said notches toward the detachable hook means in said other of said notches.

6. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being integrally connected to one end of the lens-edge member near one of said notches and comprising attached hook means adapted to fit therein, and the other of said engaging means comprising a connection portion mounted to the other end of the lens-edge member near the other of said notches and detachable hook means arranged to be detachably connected to the said connection portion, said connection portion being spaced inwardly of the edge of the lens in a horizontal direction from the detachable hook means, fastening means for securing the detachable hook means and the said connection portion together, said fastening means extending inwardly of the edge of the lens in a horizontal direction from the detachable hook means to the connection portion, whereby the force exerted by the fastening means in securing the detachable hook means and said connection portion together tends to spread the ends of the lens-edge member.

7. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being integrally connected to one end of the lens-edge member near one of said notches and comprising attached hook means adapted to fit therein, and the other of said engaging means comprising a connection portion mounted to the other end of the lens-edge member near the other of said notches and detachable hook means arranged to be detachably connected to the said connection portion, said connection portion being spaced inwardly of the edge of the lens in a horizontal direction from the detachable hook means, fastening means for securing the detachable hook means and the said connection portion together, both of said hook means having a tab engaging the flat surface of the lens around the marginal edge of the notches and having side flange portions engaging the edge surface of the lens along the marginal sides of the notches, said fastening means extending inwardly of the edge of the lens in a horizontal direction from the detachable hook means to the connection portion, whereby the force exerted by the fastening means in securing the detachable hook means and said connection portion together tends to spread the ends of the lens-edge member.

8. In a spectacle construction having a lens with a nasal small notch near the nasal edge thereof and a temple small notch near the temple edge thereof, a lens-edge member on one side of the lens following closely the contour of the edge of the lens and extending between the small notches, two engaging means connected at spaced locations to the lens-edge member, one of said engaging means being integrally connected to one end of the lens-edge member near one of said notches and comprising attached hook means adapted to fit therein, and the other of said engaging means comprising a connection portion mounted to the other end of the lens-edge member near the other of said notches and detachable hook means arranged to be detachably connected to the said connection portion, said connection portion being spaced inwardly of the edge of the lens in a horizontal direction from the detachable hook means, fastening means for securing the detachable hook means and the said connection portion together, said lens-edge member being relatively flat with its wider side substantially parallel to the surface of the lens to keep the said engaging means firmly in the notches, said fastening means extending inwardly of the edge of the lens in a horizontal direction from the detachable hook means to the connection portion, whereby the force exerted by the fastening means in securing the detachable hook means and said connection portion together tends to spread the ends of the lens-edge member.

9. In a spectacle construction having a lens, a first mounting engaging the lens, a second mounting engaging the lens, one of said mountings being a nasal mounting and the other of said mountings being a temple mounting, a lens-edge member extending between the two mountings, one end of said lens-edge member being connected to said first mounting, the other end of said lens-edge member being detachably connected to the said second mounting, said other end of the lens-edge member having a connection portion spaced inwardly of the edge of the lens in a horizontal direction from the second mounting, fastening means for securing the second mounting and the said connection portion together, said fastening means extending inwardly of the edge of the lens in a horizontal direction from the second mounting to the connection portion, whereby the force exerted by the fastening means in securing the second mounting and said connection portion together tends to spread the ends of the lens-edge member.

10. In a spectacle construction having a lens, a first mounting engaging the lens, a second mounting engaging the lens, one of said mountings being a nasal mounting and the other of said mountings being a temple mounting, a lens-edge member extending between the two mountings, one end of said lens-edge member being connected to said first mounting, the other end of said lens-edge member being detachably connected to the said second mounting, said lens having a notch to receive the second mounting, said other end of the lens-edge member having a connection portion spaced inwardly of the edge of the lens in a horizontal direction from the second mounting, fastening means for securing the second mounting and the said connection portion together, said fastening means extending inwardly of the edge of the lens in a horizontal direction from the second mounting to the connection portion, whereby the force exerted by the fastening means in securing the second mounting and said connection portion together tends to spread the ends of the lens-edge member, the lens-edge member constraining the second mounting in the said notch of the lens.

11. In a spectacle construction having a lens, a first mounting engaging the lens, a second mounting engaging the lens, one of said mountings being a nasal mounting and the other of said mountings being a temple mounting, a lens-edge member extending between the two mountings, one end of said lens-edge member being connected to said first mounting, the other end of said lens-edge member being detachably connected to the said second mounting, said lens having a first notch to receive the first mounting and a second notch to receive the second mounting, said other end of the lens-edge member having a connection portion spaced inwardly of the edge of the lens in a horizontal direction from the second mounting, fastening means for securing the second mounting and the said connection portion together, said fastening means extending inwardly of the edge of the lens in a horizontal direction from the second mounting to the connection portion, whereby the force exerted by the fastening means in securing the second mounting and said connection portion together tends to spread the ends of the lens-edge member, the lens-edge member constraining the first and second mountings into their respective notches in the lens.

12. In a spectacle construction having a lens, a first mounting engaging the lens, a second mounting engaging the lens, one of said mountings being a nasal mounting and the other of said mountings being a temple mounting, a lens-edge member extending between the two mountings, one end of said lens-edge member being connected to said first mounting, the other end of said lens-edge member being detachably connected to the said second mounting, said lens having a first notch to receive the first mounting and a second notch to receive the second mounting, said other end of the lens-edge member having a connection portion spaced inwardly of the edge of the lens in a horizontal direction from the second mounting, fastening means for securing the second mounting and the said connection portion together, said fastening means extending inwardly of the edge of the lens in a horizontal direction from the second mounting to the connection portion, whereby the force exerted by the fastening means in securing the second mounting and said connection portion together tends to spread the ends of the lens-edge member, the lens-edge member constraining the first and second mountings into their respective notches in the lens, said lens-edge member being relatively flat with its wider side substantially parallel to the surface of the lens to give rigidity thereto and to constrain the ends thereof from spreading in the plane of the lens.

DAVID SLOTSKY.